United States Patent Office 3,730,744
Patented May 1, 1973

3,730,744
ALUMINUM PHOSPHATE BONDED REFRACTORY
AND METHOD FOR MAKING THE SAME
Paul J. Yavorsky, Wyckoff, N.J., assignor to Basic
Ceramics Incorporated, Hawthorne, N.J.
No Drawing. Filed Aug. 31, 1970, Ser. No. 68,547
Int. Cl. C04b 35/48
U.S. Cl. 106—57           10 Claims

ABSTRACT OF THE DISCLOSURE

A refractory ceramic composition suitable for use in casting refractory shapes and making a ceramic product. The composition comprises a ceramic aggregate which has a particle size distribution suitable for the production of a ceramic article. The aggregate particles are bonded together by an aluminum dihydrogen orthophosphate bonding solution which is cured with a curing agent capable of supplying alkalinizing ions at a controllable rate to the solution to gel the same. The composition is capable of being cast in a mold, and hardens in situ. The cast article has high wet strength and can be stripped from the mold without removal of contained free water. Subsequent relatively intense heating produces the ceramic product.

---

The present invention relates to a composition containing an aluminum phosphate bonding solution for making refractory ceramic shapes, and also to a process by which such composition can be cast and hardened in situ without external heating.

It is known to bond together ceramic aggregate particles using complex polymerizable salts which form gels upon polymerization. These salts have the advantage that they impart some plasticity and pliability to the ceramic article. In addition, they tend to provide higher strengths throughout their temperature ranges of decomposition. However, they must have their water of solution removed before gelation occurs, or must be heated to induce gelation.

One such polymerizable salt which has been used as binder for ceramic powders and aggregates is the polyphosphate of ammonium. At present, because of the need for removal of the water of solution, use of this salt is limited to a fabrication technique which can provide for dehydration while the shaped article is confined in the mold, or to a technique in which the ceramic article can be shaped from a powder or aggregate bearing the polyphosphate salt with a reduced amount of water so that the formed shape may be removed from the mold; as in dry pressing or extrusion.

The self-setting characteristic of magnesite bonded by ammonium polyphosphate has been taught as applied to gunning compositions. Such coatings present a large surface area to mass ratio, or exposure to the atmosphere, which considerably assists in the hardening process. Hardening throughout the mass is slow, however as the surface becomes skinned with a dense film of low water permeability.

Bonding aggregate materials with an aluminum phosphate solution is known, but such bonding also has heretofore required removal of water from the mass to effect hardening. One such aluminum phosphate solution is Alkophos C (trademark) from the Monsanto Company. As with an ammonium phosphate, it has hitherto not been possible to cast an aggregate slurry in a confined mold using this bonding solution. In the absence of exposure to the atmosphere for evaporative hardening, the casting fails to self-harden.

Accordingly, it is a principal object of the present invention to provide a process and composition whereby a castable refractory can be prepared without the necessity of removing the water of solution of the bonding agent, or applying heat externally to produce bonding.

A further object of the present invention is to provide a ceramic composition which can be formed into a castable refractory and which hardens hydraulically while still confined and containing all of its tempering water.

To the accomplishment of the foregoing and related ends, the invention, then comprises the features hereinafter fully described and particularly pointed out in the claims, the following description setting forth in detail certain illustrative embodiments of the invention, these being indicative, however, of but several of the various ways in which the principles of the invention may be employed.

In accordance with the present invention, a ceramic article is prepared by admixing a ceramic aggregate material having a distribution of particle sizes necessary for such an article with aluminum dihydrogen orthophosphate, $Al(H_2PO_4)_3$, bonding solution and a curing agent capable of supplying alkalinizing ions to the solution to gel the same. The resulting slurry is cast into a mold, and hardens in situ without the application of heat. The finished ceramic product is obtained by removal of the article from the mold (hardening being sufficient to permit this), and relatively intense heating to produce a polyphosphate bonded product.

It is a feature of the invention that the ceramic aggregate material employed is substantially insoluble and inert in the aluminum phosphate bonding solution. Suitable ceramic materials of this class are alumina, mullite, zirconia, magnesium aluminates, beryllia, cordierite, dumoreterite, and pyrophyllite. Other aggregate materials which can be employed in the composition of the present invention are calcined clay, silicate aggregates, carbides, silicates, nitrides, borides, and some metal powders and grits. Preferred ceramic materials are alumina, mullite and zirconia.

The aggregate has a particle size distribution suitable for the production of a ceramic article. Preferably, at least about 10% by weight of the aggregate material should have a particle size of —325 mesh or smaller (as measured by a U.S. Standard Sieve Size test), and preferable between 10 to 30% by weight should be of such mesh. This material is frequently termed in the art as "flour." The use of so-called "flour" achieves optimum density and crushing strength in the resultant ceramic product.

Certain ceramic materials, such as magnesite (particularly when a substantial portion of the material for instance 10% or more, is of very fine or small particle size) are far too reactive to be used with aluminum phosphate solutions, even when the latter is applied as a syrupy concentrate. Such reactive aggregate materials are not within the scope of the present invention.

The aluminum dihydrogen orthophosphate solution can be any of those commercially available, for instance, produced by the Monsanto Company under the trade name Alkophos C. Typical physical and chemical properties of Alkophos C are as follows:

TABLE I

Typical analysis:
| | | |
|---|---|---|
| $P_2O_5$ | wt. percent (equivalent) | 32.6 |
| $Al_2O_3$ | do | 8.6 |
| $AlPO_4$ | do | 20.6 |
| $H_3PO_4$ | do | 28.4 |
| Specific gravity | | 1.50 |

If so purchased, the Alkophos C can be used at full strength, but preferably it is diluted with an equal amount of water to half strength so that it has a specific gravity of about 1.25.

Additionally the aluminum dihydrogen orthophosphate solution of the present invention can be prepared by the reaction of a reactive aluminum orthophosphate $$Al(PO_4),$$

aluminum hydroxide or colloidal alumina with hot, concentrated phosphoric acid. Preferably the aluminum dihydrogen orthophosphate solution has a specific gravity of 1.25, containing about 16% $P_2O_5$ and about 4.3% $Al_2O_3$.

A typical reaction of aluminum orthophosphate and phosphoric acid is probably (1) $\quad AlPO_4 + 2H_3PO_4 \rightleftharpoons Al(H_2PO_4)_3$ In a specific example, 62 grams of powdered aluminum orthophosphate were added to 70 cc. of 85% phosphoric acid. The solution was aged or warmed until thickening had well progressed. It was then diluted with 50 cc. of water, and boiled while covered until the slurry became a nearly clear solution. Some water was driven off during this digestion period. The aluminum phosphate solution was then further diluted until the specific gravity was in the order of about 1.25, giving a $P_2O_5$ concentration of about 16 weight percent (0.203 gram per cc.) and an $Al_2O_3$ concentration of about 4.3 weight percent (0.054 gram per cc.).

As another example, aluminum hydrate such as Cawood Wharton Company's GC aluminum hydrate powder, was boiled in a phosphoric acid solution until the slurry became a clear solution. The aluminum hydrate is highly reactive and produced the soluble dihydrogen orthophosphate. The solution was then diluted to give a specific gravity of 1.25 and $P_2O$ and $Al_2O_3$ contents of 0.203 and 0.054 gram per cc. respectively.

In general, any aluminum orthophosphoate solution can be used irrespective of its method of preparation, although the solution should be low in excess phosphoric acid. Care should be taken to assure that all of the aluminum compound that can be dissolved in the phosphoric acid has been added, thus assuring that the solution bears an excess of the solute rather than an excess of the acid. This is effected simply by adding small additions of the solute until some cloudiness remains, and then diluting the solution.

Although the preferred concentration of the phosphate solution is that to produce a specific gravity of 1.25 and $P_2O_5$ and $Al_2O_3$ contents of about 16% and 4.3% by weight, respectively, the concentration can be varied and is workable between specific gravities of about 1.12 and about 1.5, with corresponding $P_2O_5$ and $Al_2O_3$ contents as follows:

TABLE II

| Phosphate solution | Specific gravity of— | | |
|---|---|---|---|
| | 1.12 | 1.25 | 1.50 |
| $P_2O_5$ content: | | | |
| Weight percent (typical) | 8.0 | 16.0 | 32.6 |
| Grams/cc. (typical) | 0.103 | 0.203 | 0.406 |
| $Al_2O_3$ content: | | | |
| Weight percent (typical) | 2.2 | 4.3 | 8.6 |
| Grams/cc. (typical) | 0.027 | 0.054 | 0.108 |

The specific concentration selected is determined by the fluidity of the solution versus the final bond strength desired and is limited at the maximum concentration by the tackiness which can be tolerated in the casting.

Conventionally refractory aggregate mixtures bonded with the aluminum dihydrogen orthophosphate are cured by heating to produce a rigid article. As the temperature rises during the curing process, it is generally assumed that the phosphate is dehydrated to form, first, a compound such as $Al_2(H_2P_2O_7)_3$ and, secondly, at somewhat higher temperatures, a compound such as $Al(PO_3)_3$. The latter compound is assumed to be a polyphosphate. One of the difficulties of the use of these bonding agents in the manufacture of cast ceramic articles is the difficulty of releasing the water contained in the mixture when the latter is confined in a mold.

In accordance with the present invention, the formation of strong cementitious bonds are obtained with aluminum dihydrogen orthophosphate solutions without any external heating while the article is confined in the mold. The formation of this strong bond is brought about as mentioned above by the addition of a small amount of curing agent which is capable of supplying alkaline ions to the aluminum dihydrogen orthophosphate dissolved in the aqueous bonding solution. It is essential that the curing agent be alkaline and that the alkaline ions be released sufficiently slowly that a gradual reaction is effected. A preferred curing agent is magnesium oxide. One form of this is ground MgO, which has been originally fused. It is hypothesized that the reaction between the aluminum dihydrogen orthophosphate and magnesia probably causes the formation of some hydrated or anhydrous form of aluminum monohydrogen orthophosphate. Possibly this intermediate bond may also be comprised of some hydrated form of normal aluminum phosphate. Various hydrated forms of magnesium phosphate such as $Mg_3(PO_4)_2 \cdot 4H_2O$ or $Mg_3(PO_4)_2 \cdot 8H_2O$ may also be formed. This intermediate cementitious bond of uncertain composition hardens sufficiently at room temperature that the article has a high wet strength non-tacky surface so that it can be removed from its mold.

After removal from the mold, the cast article can be heated. Subsequent heating at about 275° C. possibly produces the rigid anhydrous aluminum phosphate such as $Al_2(H_2P_2O_7)_3$ which in turn, after intensive heating at about 500° C., produces a strong polyphosphate such as $Al(PO_3)_x \cdot 3/2H_2O$. It must be noted that the above-mentioned formation of various species of aluminum phosphates must be considered as hypothetical and do not form a part of this invention disclosure. They are simply illustrative of the possible compounds that might be formed during the initial reaction of alkaline ions with the aluminum phosphate bonding solution and their subsequent conversion to less hydrated aluminum phosphate compounds upon heating.

Other suitable curing agents which are slowly soluble in an acidic medium and thus suitable in the present invention are lithium silicate ($Li_2SiO_3$), lithium aluminate ($Li_2Al_2O_4$), magnesum silicate ($MgSiO_3$), and calcium silicate ($CaSiO_3$). Generally, any oxide, carbonate, hydroxide, silicate, aluminosilicate and phosphate of magnesium, calcium, barium, strontium, lanthanum, yttrium, and lithium can be employed. Further specific examples of curing agents are tri-basic calcium phosphate, dolomite, synthetic spodumene, samarium oxide, magnesium zirconium silicate, magnesium titanate, magnesium zirconate and calcium disilicate. Also glasses bearing alkalies or alkaline earth metals were satisfactorily tested.

A common feature of these alkalinizing agents is that they are slowly soluble in an acidic medium. The chemistry of the agents other than MgO with aluminum dihydrogen orthophosphate $Al(H_2PO_4)_3$, is less established, but they all react controllably to form vibrant gels essential to the adequate hardening of the aggregate compositions bearing these reactants to permit mold release.

The amount of aluminum dihydrogen orthophosphate solution required for the aggregate material is determined simply by mixing 100 grams of aggregate of such composition and sizing as desired and wetting this with the binder solution of the concentration desired to the wetness or fluidity desired.

The quantity of such aluminum dihydrogen orthophosphate solution employed will generally be in the range of from about 10% to about 30% by weight, based on the weight of the ceramic aggregate.

The weight percent of curing agent, based on the aggregate weight, which is employed is in the range of from about 0.5% to about 3.0%, although the exact amount is dependent upon the rate of setting and useful working life desired. Generally the rate of setting is a function of the degree of slurry dilution, of the quantity of curing agent in the slurry, of the particle size of the curing agent, and of the density and chemical inertness of the agent.

For instance, it was determined that one gram of fused magnesia of 44 to 10 microns sizing would harden 12½ cc. of aluminum dihydrogen phosphate solution (1.25 specific gravity) in 30 minutes; whereas, one gram of fused magnesia of 75 to 44 microns would harden 12½ cc. of the same solution in two hours.

It has been found that a useful working life, viz, the time from mixing to thickening, can be provided by using a curing agent having a particle size of from approximately 150 microns to about 10 microns. For example, when fused magnesia is employed as the curing agent, it has been found that particle sizes of about 44 microns to about 10 microns provide a working time of approximately 20 to 30 minutes; a particle size between about 75 microns and about 44 microns provides a working time of about 1 hour; and a particle size between about 150 microns and about 75 microns provides at least two hours of working time.

If the aggregate is ground finely, or has a high degree of porosity such that it would soak up some of the available binder solution making the solution unavailable for immediate reaction, longer hardening times may be required.

Subsequent curing above 900° decomposes the reactant phosphates so that the resulting refractoriness is essentially that of the oxide, carbide, nitride, silicide, etc. of the mixed residue. For instance, a 99.6% $Al_2O_3$ fused alumina aggregate bonded by the aluminum phosphate bond cured with .75% by weight MgO would have a melting temperature close to or not far from the approximate 2000° C. melting temperature of 99.25% $Al_2O_3$ plus .75% MgO residue.

In this respect, the curing agent selected should not be considered a contaminant (particularly one which would reduce the refractoriness) at its concentration level with respect to the aggregate.

The invention will be better understood by reference to the following illustrative examples. In the following examples, the term "vehicle" is used with reference to the dihydrogen orthophosphate bonding solution where convenient to simplify the description.

EXAMPLES 1–3

Fused mullite having a distribution of particle sizes necessary for a ceramic castable refractory was dry tumbled for one hour to insure uniform distribution of agglomerates. Three one hundred gram samples of the dry aggregate were then wetted with equal amounts of an aqueous aluminum dihydrogen orthophosphate bonding solution of 1.25 specific gravity having a concentration of about 0.203 g./cc. $P_2O_5$ and 0.054 g./cc. $Al_2O_3$ (see Table II). Fused magnesia curing agent of a weight percent based on the weight of the aggregate had been dry tumbled with the fused mullite.

The slurry was cast into a rubber mold with a cavity nominally 1¼ inches wide by 3 inches long and by 1 inch deep. The following table indicates the variation in setting time which resulted.

The set period is that interval from batching to a hardness that would not permit penetration by a sharp probe without chipping. At such hardness, the cast article has sufficient wet strength and no tackiness to permit removal from the mold.

TABLE III

| Example No. | 1 | 2 | 3 |
|---|---|---|---|
| Batch ceramic aggregate, weight percent: | | | |
| −4+8 mesh fused mullite | 10 | 10 | 10 |
| −8+14 mesh fused mullite | 10 | 10 | 10 |
| −14+30 mesh fused mullite | 13 | 13 | 13 |
| −30+50 mesh fused mullite | 13 | 13 | 13 |
| −50+100 mesh fused mullite | 18 | 18 | 18 |
| −100 mesh fused mullite | 18 | 18 | 18 |
| −325 mesh fused mullite | 9 | 9 | 9 |
| −325 mesh calcined china clay | 9 | 9 | 9 |
| Total | 100 | 100 | 100 |
| Fused MgO curing agent (weight percent based on weight of aggregate) | 0.75 | 0.75 | 1.00 |
| Sizing MgO, mesh | −200+325 | −325 | −325 |
| Aluminum phosphate bonding solution per 100 grams of aggregate (specific gravity 1.25), cc. | 12 | 12 | 12 |
| Setting period, hours | 4 | 1 | 0.2 |

The curative agent for most examples was selected as magnesia to simplify the comparisons. The Example 2 batch contains the same amount of magnesia as Example 1, but it is more finely sized in Example 2. The finer magnesia reacts more readily, and thus, reduces the setting period. Example 3 bearing an increased amount of the fine magnesia still further reduces the setting period.

TABLE IV

| Example No. | 4 | 5 | 6 |
|---|---|---|---|
| Batch ceramic aggregate, percent: | | | |
| −4+8 calcined mullite | 10 | 10 | |
| +8+14 calcined mullite | 10 | 10 | 10 |
| −14+30 calcined mullite | 13 | 13 | 15 |
| −30+50 calcined mullite | 13 | 13 | 15 |
| −50+100 calcined mullite | 18 | 18 | 20 |
| −100 calcined mullite | 18 | 18 | 20 |
| −325 calcined mullite | 9 | 9 | 10 |
| −325 calcined china clay | 9 | 9 | 10 |
| Total | 100 | 100 | 100 |
| −325 mesh fused magnesia curing agent (weight percent based on weight of aggregate) | 0.75 | 1.0 | 1.0 |
| Aluminum phosphate bonding solution per 100 grams of aggregate (specific gravity 1.25), cc. | 15 | 15 | 13 |
| Setting period, hours | 7 | 5 | 6 |

Example 4 compared to Example 2 depicts the increased amount of vehicle or bonding solution required due to the decreased density of the calcined mullite (as compared to fused mullite) employed in Example 4. The same weight of batch in Example 4 has more surface area to coat, requiring more vehicle to fluidize it. Additionally some calcined aggregates are porous, requiring even more vehicle, as the latter is absorbed into the granules. The increased vehicle accordingly extends the setting period.

Again, the setting period is reduced with an increased amount of curative as illustrated by Examples 4 and 5. Example 6 compared to Example 5 shows the effect of increasing the fineness of the aggregate which then requires more vehicle for an equivalent fluidization. The increased vehicle to curative ratio extends the setting period.

TABLE V

| | 7 | 8 |
|---|---|---|
| Batch ceramic aggregate: | | |
| −50+100 fused alumina | 50 | |
| −100 fused alumina | 40 | |
| −50+100 fused $MgO \cdot Al_2O_3$ spinel | | 50 |
| −100 fused $MgO \cdot Al_2O_3$ spinel | | 40 |
| −325 calcined alumina | 10 | 10 |
| Total | 100 | 100 |
| −325 mesh fused magnesia curing agent | 1.0 | 1.0 |
| Aluminum phosphate bonding solution per 100 grams of aggregate (specific gravity 1.25), cc. | 13 | 13½ |
| Setting period, hours | 1.25 | 1.25 |

Examples 7 and 8 show that the slightly lighter fused spinel of Example 8 than the fused alumina of Example 7 required a slight increase in vehicle to achieve equivalent fluidity. Despite the decreased curative to vehicle ratio, the setting period is equal. This is explained by the curative contribution from the MgO·Al₂O₃ spinel which was not entirely insoluble in the vehicle.

As suggested in Example 8, it is possible for some aggregate materials (when a substantial part is finely ground as flour) to be sufficiently soluble in the slightly acidic aluminum dihydrogen orthophosphate solution to supply the required alkalinizing hydroxy ions such that an additional alkalinizing curative agent need not be added to effect hydraulic setting. The setting rate is controled by proportioning the —325 powder and is fineness.

TABLE VI

| | Example number | | |
|---|---|---|---|
| | 9 | 10 | 11 |
| | Calcined forsterite | Calcined forsterite | Calcined synthetic spodumene |
| Aggregate material: | | | |
| —50+100, percent | 80 | 80 | 70 |
| —100, percent | | | |
| —325, percent | 20 | 20 | 30 |
| Fused magnesia curing agent (weight percent based on weight of aggregate —325 mesh), percent | 2 | 2 | |
| Lithium silicate curing agent (—325 mesh) | | | 1 |
| Aluminum phosphate bonding solution per 100 grams of aggregate (specific gravity 1.25), cc./100 g | 23 | | 36 |
| Aluminum dihydrogen phosphate bonding solution per 100 grams of aggregate (specific gravity 1.40), cc./100 g | | 23 | |
| Setting period with curative, hours | 0.15 | 0.67 | .15 |
| Setting period without curative, hours | 2.0 | 2.0 | 1.5 |

In Example 10, the phosphate solution is about 1½ strength, i.e., at specific gravity 1.40 it has an P₂O₅ equivalent of about 25% (by weight). The concentrated aluminum orthophosphate solution can be diluted to increase its ionization constant, accelerating the reaction with the curative (Example 9).

The succeeding examples merely show that the aluminum phosphate solution plus curative, hydraulically setting, binder system can be employed for many aggregates which vary widely in composition and sizing.

TABLE VII

Example 12

| Batch ceramic aggregate: | Percent |
|---|---|
| —4+8 fused zirconia | 10 |
| —8+14 fused zirconia | 10 |
| —14+30 fused zirconia | 13 |
| —30+50 fused zirconia | 13 |
| —50+100 fused zirconia | 18 |
| —100 fused zirconia | 18 |
| —325 calcined zirconia | 18 |
| Total | 100 |

—200+325 fused magnesia (wt. percent) based on wt. of aggregate) ___ 0.75
Aluminum phosphate bonding solution, 1.25 g./cc. ___cc./100 g. aggregate___ 9
Setting period, hours ___ 3.5

The fused zirconia is partially stabilized with calcium oxide in solid solution and is resistant to aqueous chemical solution. The calcined zirconia may be unstabilized, partially stabilized or fully stabilized (cubic).

TABLE VIII

Example 13

| Batch ceramic aggregate | percent |
|---|---|
| —100 zircon sand | 86 |
| —200 zircon sand | 4 |
| —325 zircon | 5 |
| 2 micron zircon | 5 |

—325 fused magnesia (wt. percent based on wt. of aggregate) ___ 1.0
Aluminum phosphate bonding solution, 1.25 g./cc. ___cc./100 g. aggregate___ 12
Setting period, hours ___ 1.8

TABLE IX

Example 14

| Batch ceramic aggregate | Percent |
|---|---|
| —80 fused silicon carbide | 30 |
| —80+270 fused silicon carbide | 40 |
| —325 fused silicon carbide | 30 |

—325 fused magnesia (wt. percent based on wt. of aggregate) ___ 1.0
Aluminum phosphate solution, 1.25 g./cc. ___cc./100 g. aggregate___ 19
Setting period ___hours___ 2

TABLE X

Example 15

| Batch ceramic aggregate | Percent |
|---|---|
| —30+50 high calcined beryllia | 20 |
| —50+100 high calcined beryllia | 20 |
| —100 high calcined beryllia | 40 |
| —325 high calcined beryllia | 15 |
| —325 low calcined beryllia | 5 |

—200+325 fused magnesia (wt. percent based on wt. of aggregate) ___ 0.5
Aluminum phosphate bonding solution, 1.25 g./cc. ___cc./100 g. aggregate___ 18
Setting period, hours ___ 1.8

In general, with all else constant, the setting period of the wetted castable is extended when:

(a) the amount of curative is decreased;
(b) the curative is coarser grained;
(c) the amount of aluminum phosphate solution of a fixed concentration is increased;
(d) and the concentration of the aluminum phosphate solution is increased.

The amount of aluminum phosphate solution required to achieve equal fluidity increases when:

(a) the batch aggregate is made of finer sizings; and this is predominately determined by the amount and fineness of the flour (—325) portion of the aggregate;
(b) the batch aggregate increases in porosity;
(c) the batch aggregate decreases in density.

If the phosphate solution is too concentrated, to the extent that it is a viscous syrupy solution, it has the disadvantage that it inhibits complete reaction resulting in only a partial set. The viscous solution coats the aggregate grains to form a gelatinous film which has low water permeability. Castings made from such solutions remain overly pliable and have tacky surfaces which are difficult to release from the mold surface without distortion or scarring.

If the phosphate solution is too dilute, or has too high an acid concentration, or dissociates to give high acid concentrations, it may react so vigorously that the working periods are unacceptably short, or may require more alkalinization than can be supplied by the curative agent. In the latter case, a complete set is never achieved.

The present invention employs a phosphate bonding solution that has low viscosity, low excess acid concentration, and produces a reaction product with an alkalinizing curing agent that is essentially insoluble and reacts so completely that castings have high wet strength and non-tacky surfaces.

Greater concentrations of phosphate can be incorporated in the casting by using a pyrophosphate salt of the curative oxide. For example, instead of using MgO as a curing agent, $Mg_2P_2O_7$ can be employed. Then, even if an aluminum phosphate solution of low aluminum content were used, the final casting should show a phosphate bond content equivalent to that obtained when using a more concentrated binder solution.

Since the phosphate in the casting decomposes to a $P_2O_7$ on heating and is finally driven off as $P_2O_5$, high concentrations of phosphate are not generally objectionable.

I claim:

1. A method of making a dense, high-strength, fired ceramic article comprising the steps of independently admixing with a ceramic aggregate material sufficient aluminum orthophosphate solution to fluidize the ceramic aggregate material for mold forming the same and about 0.5–3.0 weight percent curing agent, based on the weight of ceramic aggregate material, capable of supplying alkalinizing ions to said solution to gel the same; said ceramic aggregate material having a particle size distribution suitable for the production of a ceramic article including about 10–30 percent by weight fines having a particle size less than about −325 mesh; said aluminum phosphate solution being aluminum dihydrogen orthophosphate having a specific gravity between about 1.12 and about 1.50, a $P_2O_5$ content between about 8 and about 32.6 weight percent, and an $Al_2O_3$ content between about 2.2 and about 8.6 weight percent; placing the resulting slurry in a mold to form a casting, allowing the same to harden in such mold without the application of heat, and subsequently removing the casting from the mold.

2. The method of claim 1 in which said ceramic aggregate material is of the class consisting essentially of alumina, mullite and zirconia.

3. The method of claim 1 in which said curing agent is magnesium oxide.

4. The method of claim 1 in which the casting after removal from the mold is intensively heated at a sufficiently high temperature to form a rigid, hard, ceramic article.

5. The method of claim 4 in which said casting is heated at a sufficiently high temperature to volatilize the phosphates so that the casting has a resulting refractoriness which is essentially that of the ceramic aggregate material.

6. The method of claim 1 in which said curing agent is selected from the group consisting essentially of the oxides, carbonates, hydroxides, silicates, alumino-silicates and phosphates of magnesium, calcium, barium, strontium, lanthanum, yttrium and lithium.

7. The method of claim 1 in which said curing agent and ceramic aggregate material are dry tumbled together prior to admixing the aluminum phosphate bonding solution therewith.

8. The method of claim 1 in which said curing agent and ceramic aggregate material are the same, the fines of said ceramic aggregate material being sufficiently soluble in the aluminum dihydrogen orthophosphate solution to supply alkalinizing ions to the same.

9. The method of claim 1 in which said phosphate solution is aluminum dihydrogen orthophosphate having a specific gravity of about 1.25, a $P_2O_5$ content of about 16 weight percent, and an $Al_2O_3$ content of about 4.3 weight percent, the amount of solution employed being about 10 to about 30 weight percent based on the weight of the ceramic aggregate.

10. The method of claim 1 in which said curing agent has a particle size between about 150 microns and about 10 microns.

References Cited
UNITED STATES PATENTS

| | | | |
|---|---|---|---|
| 2,450,952 | 10/1948 | Greger | 106—85 |
| 2,769,718 | 11/1956 | Ault | 106—85 |
| 3,148,996 | 9/1964 | Vukasovich et al. | 106—85 |
| 3,202,520 | 8/1965 | Enoch | 106—85 |
| 3,538,202 | 11/1970 | Bidard | 106—85 |

JAMES E. POER, Primary Examiner

U.S. Cl. X.R.
106—58, 65, 85